United States Patent
Minamide et al.

(10) Patent No.: US 9,102,849 B2
(45) Date of Patent: Aug. 11, 2015

(54) THERMOPLASTIC POLYMER COMPOSITION AND MOLDED ARTICLE

(75) Inventors: Asako Minamide, Ibaraki (JP); Mikio Masuda, Ibaraki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 207 days.

(21) Appl. No.: 13/808,688

(22) PCT Filed: Jul. 5, 2011

(86) PCT No.: PCT/JP2011/065404
§ 371 (c)(1),
(2), (4) Date: Mar. 15, 2013

(87) PCT Pub. No.: WO2012/005270
PCT Pub. Date: Jan. 12, 2012

(65) Prior Publication Data
US 2013/0196164 A1 Aug. 1, 2013

(30) Foreign Application Priority Data

Jul. 9, 2010 (JP) ................................. 2010-157206

(51) Int. Cl.
| | |
|---|---|
| *C08L 53/00* | (2006.01) |
| *C08L 29/04* | (2006.01) |
| *C09D 153/02* | (2006.01) |
| *C09J 123/02* | (2006.01) |
| *C08L 29/14* | (2006.01) |
| *C08L 53/02* | (2006.01) |
| *C09D 133/10* | (2006.01) |

(52) U.S. Cl.
CPC ............... *C09D 153/02* (2013.01); *C08L 29/14* (2013.01); *C08L 53/02* (2013.01); *C09D 133/10* (2013.01); *C09J 123/02* (2013.01); *Y10T 428/31667* (2015.04); *Y10T 428/31696* (2015.04); *Y10T 428/31699* (2015.04); *Y10T 428/31931* (2015.04); *Y10T 428/31935* (2015.04)

(58) Field of Classification Search
USPC ........................................................ 524/505
See application file for complete search history.

(56) References Cited

U.S. PATENT DOCUMENTS

2010/0174027 A1   7/2010   Sasaki et al.
2010/0273012 A1*  10/2010  Moriguchi et al. ........... 428/437

FOREIGN PATENT DOCUMENTS

| JP | 56 118452 | 9/1981 |
|---|---|---|
| JP | 63 25005 | 11/1994 |
| JP | 9 156035 | 6/1997 |
| JP | 10 101942 | 4/1998 |
| JP | 2004217701 A * | 8/2004 |
| JP | 2005 82675 | 3/2005 |
| JP | 2006 206715 | 8/2006 |
| JP | 2006 291019 | 10/2006 |
| JP | 2007 302907 | 11/2007 |
| JP | 2009 227844 | 10/2009 |
| JP | 2010 1364 | 1/2010 |
| WO | 2007 122995 | 11/2007 |
| WO | 2009 081877 | 7/2009 |

OTHER PUBLICATIONS

Machine translation of JP 2004217701 A, retrieved Sep. 26, 2014.*
U.S. Appl. No. 13/812,359, filed Jan. 25, 2013, Minamide, et al.
U.S. Appl. No. 13/638,312, filed Nov. 26, 2012, Kuwahara, et al.
U.S. Appl. No. 14/371,858, filed Jul. 11, 2014, Minamide, et al.
International Search Report Issued Sep. 27, 2011 in PCT/JP11/65404 Filed Jul. 5, 2011.
U.S. Appl. No. 13/818,695, filed Feb. 25, 2013, Minamide, et al.

* cited by examiner

*Primary Examiner* — Hui Chin
(74) *Attorney, Agent, or Firm* — Oblon, McClelland, Maier & Neustadt, L.L.P.

(57) ABSTRACT

A thermoplastic polymer composition which is excellent in flexibility, mechanical properties, and moldability and is capable of adhering to ceramics, metals, and synthetic resins even by heat treatment at a low temperature (for example, 190° C. or lower) without the treatment with a primer, and a molded product obtained by using the thermoplastic polymer composition. The thermoplastic polymer composition includes 100 parts by mass of a thermoplastic elastomer (A), 1 to 100 parts by mass of a polyvinyl acetal resin (B), 5 to 100 parts by mass of a polar group-containing olefin-based copolymer (C), and 0.1 to 300 parts by mass of a softener (D). The thermoplastic elastomer (A) is a block copolymer which has a polymer block constituted by aromatic vinyl compound units and a polymer block constituted by conjugated diene units or a hydrogenated product of the block copolymer.

16 Claims, 1 Drawing Sheet

THERMOPLASTIC POLYMER COMPOSITION AND MOLDED ARTICLE

This application is a 371 of PCT/JP2011/065404 filed Jul. 5, 2011. Priority to Japanese patent application 2010-157206, filed Jul. 9, 2010, is claimed.

TECHNICAL FIELD

The present invention relates to thermoplastic polymer compositions which are excellent in flexibility, mechanical properties, and moldability and capable of adhering to ceramics, metals and synthetic resins at low temperatures without treatment with a primer and other treatments and also relates to molded products produced by using the thermoplastic polymer compositions.

BACKGROUND ART

Ceramics, metals, and synthetic resins have been widely used for electrical home appliances, electronic parts, machine parts, automotive parts, and other uses, because they are excellent in durability, heat resistance, and mechanical strength. In some cases, these materials are adhered to or made into composite with an elastomeric material excellent in flexibility according to their uses, other constituting parts, and methods of use, for example, for fixing these materials to other structural members, absorbing shock, preventing damages, and sealing.

As such elastomeric material, a styrene-based thermoplastic elastomer excellent in flexibility, mechanical properties, and moldability can be suitably used. The styrene-based thermoplastic elastomer referred to herein is a block copolymer having a polymer block constituted by aromatic vinyl compound units and a polymer block constituted by conjugated diene units and a hydrogenated product of the block copolymer. However, since the adhesion strength of the styrene-based thermoplastic elastomer to ceramics and metals are poor because of its low polarity, the styrene-based thermoplastic elastomer cannot be fuse-bonded to these materials without an additional treatment. To eliminate this problem, several methods have been proposed, in which the surface of ceramics, metals, or synthetic resins is coated with an adhesive or treated with a primer before adhering the styrene-based thermoplastic elastomer to ceramics, metals, or synthetic resins (Patent Documents 1 to 6).

However, the methods disclosed in Patent Documents 1 to 6 include complicated steps and also the productivity is low to increase production costs.

To eliminate this problem, a thermoplastic polymer composition containing a styrene-based thermoplastic elastomer and a polyvinyl acetal, which is excellent in adhesion to ceramics, metals, and synthetic resins, is proposed (Patent Document 7). The proposed thermoplastic polymer composition adheres to ceramics, metals, and synthetic resins only by heat treatment without adhesive or treatment with a primer.

PRIOR ART DOCUMENTS

Patent Documents

Patent Document 1: JP 2006-291019A
Patent Document 2: JP 2006-206715A
Patent Document 3: JP 63-25005A
Patent Document 4: JP 9-156035A
Patent Document 5: JP 2009-227844A
Patent Document 6: JP 2010-1364A
Patent Document 7: WO 2009/081877

SUMMARY OF THE INVENTION

Problems to be Solved by the Invention

The thermoplastic polymer composition disclosed in Patent Document 7 is excellent in flexibility, mechanical properties, moldability, and adhesion. However, a molded product is produced by adhering the thermoplastic polymer composition to ceramics, metals, or synthetic resins at high temperature of 200° C. or higher (particularly, 240° C. or higher for adhering to ceramics or metals). As a result of extensive research, the inventors have found that the thermoplastic polymer composition disclosed in Patent Document 7 does not exhibit a sufficient adhesion at 180° C. or lower. In an injection molding machine or an extruder, the thermoplastic polymer composition is molten by heating to 200° C. or higher. Immediately after the extrusion, the surface of the extruded composition is cooled to 200° C. or lower, thereby likely to reduce the adhesion ability. Therefore, it is necessary to maintain the temperature of the extruded resin at 200° C. or higher by heating with an additional heater which is installed into an existing injection molding machine or extruder. Since many of the members made of synthetic resins are generally molten or deformed at temperature as high as 200° C. or higher, the member around the portion to be adhered is damaged by heating.

The present invention has been made in view of the above problems and intends to provide a thermoplastic polymer composition which is excellent in flexibility, mechanical properties, and moldability and is capable of adhering to ceramics, metals, and synthetic resins even by the heat treatment at low temperature (for example, 190° C. or lower) without the treatment with a primer, and also provide a molded product produced by using the thermoplastic polymer composition.

Means for Solving the Problems

As a result of extensive research, the inventors have found that the above problems are solved by a thermoplastic polymer composition comprising a thermoplastic elastomer (A), a polyvinyl acetal resin (B), a polar group-containing olefin-based copolymer (C), and a softener (D) in specific blending ratios, wherein the thermoplastic elastomer (A) is a block copolymer which comprises a polymer block comprising aromatic vinyl compound units and a polymer block comprising conjugated diene units or a hydrogenated product of the block copolymer. The present invention is based on this finding.

Namely, the present invention provides:

1. a thermoplastic polymer composition comprising 100 parts by mass of a thermoplastic elastomer (A), 1 to 100 parts by mass of a polyvinyl acetal resin (B), 5 to 100 parts by mass of a polar group-containing olefin-based copolymer (C), and 0.1 to 300 parts by mass of a softener (D), the thermoplastic elastomer (A) being a block copolymer which comprises a polymer block comprising aromatic vinyl compound units and a polymer block comprising conjugated diene units or a hydrogenated product of the block copolymer;
2. the thermoplastic polymer composition of item 1, comprising 100 parts by mass of the thermoplastic elastomer (A), 10 to 70 parts by mass of the component (B), 10 to 70 parts by mass of the component (C), and 1 to 200 parts by mass of the component (D);
3. the thermoplastic polymer composition of item 1 or 2, wherein the polyvinyl acetal resin (B) is obtained by acetalizing a polyvinyl alcohol having an average degree of polymerization of 100 to 4,000 to a degree of acetalization of 55 to 88% by mole;
4. the thermoplastic polymer composition of any one of items 1 to 3, wherein the polyvinyl acetal resin (B) is a polyvinyl butyral;
5. the thermoplastic polymer composition of any one of items 1 to 4, wherein the polar group-containing olefin-based copolymer (C) is an olefin-based copolymer obtained by polymerizing a copolymerizable olefin monomer and a copolymerizable polar group-containing monomer;
6. the thermoplastic polymer composition of any one of items 1 to 5, wherein a melt flow rate (MFR) of the polar group-containing olefin-based copolymer (C) is 0.1 to 100 g/10 min when measured at 190° C. under a load of 2.16 kg (21.18 N);
7. the thermoplastic polymer composition of any one of items 1 to 6, wherein Vicat softening point of the polar group-containing olefin-based copolymer (C) is 40 to 100° C.;
8. the thermoplastic polymer composition of any one of items 5 to 7, wherein a content of constitutional units derived from the copolymerizable polar group-containing monomer in the polar group-containing olefin-based copolymer (C) is 1 to 99% by mass;
9. the thermoplastic polymer composition of any one of items 5 to 8, wherein the polar group-containing olefin-based copolymer (C) is an olefin-(meth)acrylate copolymer;
10. A molded product comprising the thermoplastic polymer composition of any one of items 1 to 9;
11. the molded product of item 10, wherein the thermoplastic polymer composition is adhered to at least one material selected from ceramics, metals, and synthetic resins;
12. the molded product of item 11, wherein the thermoplastic polymer composition is adhered to at least one material selected from ceramics and metals; and
13. the molded product of item 10, wherein ceramics, metals, synthetic resins, or at least two materials selected from ceramics, metals, and synthetic resins are adhered to each other via the thermoplastic polymer composition.

Effects of the Invention

The thermoplastic polymer composition of the invention is excellent in flexibility, mechanical properties, and moldability and is capable of adhering to at least one material selected from ceramics, metals, and synthetic resins even by the heat treatment at 190° C. or lower. Therefore, the present invention has made it possible to provide a molded product comprising the thermoplastic polymer composition adhered to these materials. In addition, the treatment of these materials with a primer before the thermoplastic polymer composition is adhered to these materials is not needed.

Therefore, the molded product can be produced by an existing machine equipped with no additional heater, because the thermoplastic polymer composition discharged from an injection molding machine or an extruder is still sufficiently adhesive even after the surface thereof is cooled to 190° C. or lower. Further, the members made of various kinds of synthetic resins are not molten or deformed at 190° C. or lower, the damage of the members made of synthetic resins around the adhering portion by heating is avoided.

MODE FOR CARRYING OUT THE INVENTION

Thermoplastic Polymer Composition

The thermoplastic polymer composition of the invention comprises 100 parts by mass of a thermoplastic elastomer (A), 1 to 100 parts by mass of a polyvinyl acetal resin (B), 5 to 100 parts by mass of a polar group-containing olefin-based copolymer (C), and 0.1 to 300 parts by mass of a softener (D), wherein the thermoplastic elastomer (A) is a block copolymer constituted by a polymer block comprising aromatic vinyl compound units and a polymer block comprising conjugated diene units or a hydrogenated product of the block copolymer.

The components (A) to (D) are described below in this order.

Thermoplastic Elastomer (A)

The block copolymer constituted by a polymer block comprising aromatic vinyl compound units and a polymer block comprising conjugated diene units and its hydrogenated product, which are contained in the thermoplastic polymer composition of the invention as the thermoplastic elastomer (A) (hereinafter simply referred to as "thermoplastic elastomer (A)"), are components for providing the thermoplastic polymer composition with flexibility, good mechanical properties, and good moldability and also act as a matrix of the composition.

Polymer Block Comprising Aromatic Vinyl Compound Units

Examples of the aromatic vinyl compound which constitutes the polymer block comprising aromatic vinyl compound units include styrene, α-methylstyrene, 2-methylstyrene, 3-methylstyrene, 4-methylstyrene, 4-propylstyrene, 4-cyclohexylstyrene, 4-dodecylstyrene, 2-ethyl-4-benzylstyrene, 4-(phenylbutyl)styrene, 1-vinylnaphthalene, and 2-vinylnaphthalene. The polymer block may be constituted of units which are derived from a single kind or a combination of two or more of the above aromatic vinyl compounds. Of the above aromatic vinyl compounds, preferred are styrene, α-methylstyrene, and 4-methylstyrene.

In the present invention, the polymer block preferably comprises 80% by mass or more of the aromatic vinyl compound units, more preferably 90% by mass or more of the aromatic vinyl compound units, and still more preferably 95% by mass or more of the aromatic vinyl compound units, each based on the initial charge of the raw materials. The polymer block may be constituted of only the aromatic vinyl compound units or may be constituted of the aromatic vinyl compound units and units derived from other copolymerizable monomer if the effect of the invention is not adversely affected.

Examples of such copolymerizable monomer include 1-butene, pentene, hexene, 1,3-butadiene (also referred to as simply "butadiene"), isoprene, and methyl vinyl ether. The content of the unit of copolymerizable monomer, if used, is preferably 20% by mass or less, more preferably 10% by mass or less, and still more preferably 5% by mass or less, each based on the total of the aromatic vinyl compound units and the units of copolymerizable monomer.

Polymer Block Comprising Conjugated Diene Units

Examples of the conjugated diene compound which constitutes the polymer block comprising conjugated diene units include butadiene, isoprene, 2,3-dimethyl-1,3-butadiene, 1,3-pentadiene, and 1,3-hexadiene, with butadiene and isoprene being preferred.

The polymer block may be constituted of units which are derived from a single kind or a combination of two or more of the above conjugated diene compounds, preferably units derived from butadiene or isoprene, and more preferably units derived from butadiene and isoprene.

The manner of bonding of the conjugated diene for forming the polymer block comprising the conjugated diene units is not particularly limited. For example, butadiene is polymerized in either of 1,2-bonding or 1,4-bonding to form the polymer block, and isoprene is polymerized in either of 1,2-bonding, 3,4-bonding, or 1,4-bonding. Particularly, in the polymer block wherein the conjugated diene units are derived from butadiene, isoprene, or both butadiene and isoprene, the total content of 1,4-bonding in the conjugated diene units constituting the polymer block is preferably 1 to 99% by mole, more preferably 60 to 98% by mole, still more preferably 80 to 98% by mole, and still further preferably 90 to 98% by mole.

The content of 1,4-bonding is calculated from the result of $^1$H-NMR measurement.

The content of the conjugated diene units in the "polymer block comprising conjugated diene units" referred to herein is preferably 80% by mole or more, more preferably 90% by mole or more, and still more preferably 95% by mole or more, each being based on the initial charge of the raw materials. The polymer block may be constituted of only the conjugated diene units or the conjugated diene units together with units of an additional copolymerizable monomer, if the effect of the invention is not adversely affected.

Examples of the additional copolymerizable monomer include styrene, α-methylstyrene, and 4-methylstyrene. The content of the units of the additional copolymerizable monomer, if any, is preferably 20% by mass or less, more preferably 10% by mass or less, and still more preferably 5% by mass or less, each being based on the total of the conjugated diene units and the units of the additional copolymerizable monomer.

The polymer block comprising aromatic vinyl compound units and the polymer block comprising conjugated diene units may be bonded by any manner, for example, bonded linearly, in branches, radially, or in combination of two or more thereof, and preferably bonded linearly.

When expressing the polymer block comprising aromatic vinyl compound units as "a" and the polymer block comprising conjugated diene units as "b," examples of the polymer blocks which are bonded linearly include a diblock copolymer represented by a-b, a triblock copolymer represented by a-b-a or b-a-b, a tetrablock copolymer represented by a-b-a-b, a pentablock copolymer represented by a-b-a-b-a or b-a-b-a-b, a copolymer represented by $(a-b)_nX$ wherein X is a coupling residue and n is an integer of 2 or more, and any combinations thereof, with the triblock copolymer being preferred and the triblock copolymer represented by a-b-a being more preferred.

The polymer block comprising conjugated diene units is preferably hydrogenated partly or completely, because heat resistance and weatherability are improved. The degree of hydrogenation of the polymer block comprising conjugated diene units is preferably 80% or more, more preferably 90% or more, when determined by the iodine values of the block copolymer before and after hydrogenation reaction.

The content of the polymer block comprising aromatic vinyl compound units in the thermoplastic elastomer (A) is preferably 5 to 75% by mass, more preferably 10 to 60% by mass, and still more preferably 15 to 40% by mass, each based on the total amount of the thermoplastic elastomer (A), because flexibility and mechanical properties are good.

The weight average molecular weight of the thermoplastic elastomer (A) is preferably 30,000 to 300,000, more preferably 50,000 to 200,000, because mechanical properties and moldability are good. The weight average molecular weight is determined by gel permeation chromatography (GPC) calibrated with polystyrene.

The thermoplastic elastomer (A) may be used singly or in combination of two or more. Particularly, the combined use of a medium molecular weight product having a weight average molecular weight of 50,000 to 150,000 and a high molecular weight product having a weight average molecular weight of 150,000 to 300,000 is preferred, because mechanical properties, moldability, and adhesion can be balanced more easily. For the same reasons, the ratio of medium molecular weight product/high molecular weight product by mass is preferably 10/90 to 90/10, more preferably 20/80 to 75/25, and still more preferably 20/80 to 55/45.

Production of Thermoplastic Elastomer (A)

The production method of the thermoplastic elastomer (A) is not particularly limited, and it may be produced, for example, by anionic polymerization, such as:

(i) a method wherein first the aromatic vinyl compound, then the conjugated diene compound, and finally the aromatic vinyl compound are sequentially polymerized in the presence of an alkyllithium compound initiator;

(ii) a method wherein the aromatic vinyl compound and then the conjugated diene compound are sequentially polymerized in the presence of an alkyllithium compound initiator, and then a coupling agent is coupled; and (iii) a method wherein the conjugated diene compound and then the aromatic vinyl compound are sequentially polymerized in the presence of a dilithium compound initiator.

Examples of the alkyllithium compound for the methods (i) and (ii) include methyllithium, ethyllithium, n-butyllithium, sec-butyllithium, tert-butyllithium, and pentyllithium. Examples of the coupling agent for the method (ii) include dichloromethane, dibromomethane, dichloroethane, dibromoethane, and dibromobenzene. Example of the dilithium compound for the method (III) include naphthalene dilithium and dilithiohexylbenzene.

The amounts of use of the initiator, such as the alkyllithium compound and the dilithium compound, and the coupling agent depend upon the intended weight average molecular weight of the thermoplastic elastomer (A). Generally, the initiator, such as the alkyllithium compound and the dilithium compound, is used 0.01 to 0.2 parts by mass based on 100 parts by mass of the total of the aromatic vinyl compound and the conjugated diene compound used in the anionic polymerization. In the method (ii), the coupling agent is generally used 0.001 to 0.8 parts by mass based on 100 parts by mass of the total of the aromatic vinyl compound and the conjugated diene compound used in the anionic polymerization.

The anionic polymerization is conducted preferably in the presence of a solvent. The solvent is not particularly limited as long as it is inert to the initiator and does not adversely affect the polymerization, and examples thereof include a saturated aliphatic hydrocarbon, such as hexane, heptane, octane, and decane, and an aromatic hydrocarbon, such as toluene, benzene, and xylene. The polymerization is conducted preferably at 0 to 80° C. for 0.5 to 50 h in any of the above polymerization methods.

The content of 1,2-bonding and 3,4-bonding in the thermoplastic elastomer (A) can be increased by conducting the anionic polymerization in the presence of an organic Lewis base, for example, ester, such as ethyl acetate; amine, such as triethylamine, N,N,N',N'-tetramethylethylenediamine (TMEDA), and N-methyl morpholine; nitrogen-containing heteroaromatic compound, such as pyridine; an amide, such as dimethylacetamide; ether, such as dimethyl ether, diethyl ether, tetrahydrofuran (THF), and dioxane; glycol ether, such as ethylene glycol dimethyl ether, and diethylene glycol dimethyl ether; sulfoxide, such as dimethyl sulfoxide; and ketone, such as acetone and methyl ethyl ketone.

The non-hydrogenated thermoplastic elastomer (A) can be isolated after the polymerization by the method mentioned above by pouring the reaction product solution into a poor solvent to the block copolymer, such as methanol, thereby solidifying the block copolymer or by pouring the reaction product solution into hot water together with steam to azeotropically remove the solvent (steam stripping) and then drying.

The hydrogenated thermoplastic elastomer (A) is produced by the hydrogenation of the obtained non-hydrogenated thermoplastic elastomer (A). The hydrogenation reaction is conducted by allowing hydrogen to react with the thermoplastic elastomer (A) in the presence of a hydrogenation catalyst, using a solution of the non-hydrogenated thermoplastic elastomer (A) in a solvent inert to the reaction and the hydrogenation catalyst or using the reaction product solution without isolating the non-hydrogenated thermoplastic elastomer (A).

Examples of the hydrogenation catalyst include Raney nickel; a heterogeneous catalyst comprising a metal, such as Pt, Pd, Ru, Rh, and Ni, carried on a support, such as carbon, alumina and diatomaceous earth; and Ziegler catalyst composed of a combination of a transition metal compound with an alkylaluminum compound or an alkyllithium compound; and metallocene catalyst.

The hydrogenation reaction is generally conducted at a hydrogen pressure of 0.1 to 20 MPa and a reaction temperature of 20 to 250° C. for a reaction time of 0.1 to 100 h. The hydrogenated thermoplastic elastomer (A) is isolated after the hydrogenation in the manner mentioned above by pouring the product solution of hydrogenation into a poor solvent, such as methanol, thereby solidifying the hydrogenated thermoplastic elastomer (A) or by pouring the product solution of hydrogenation into hot water together with steam to azeotropically remove the solvent (steam stripping) and then drying.

To improve the properties, such as adhesion, of the thermoplastic polymer composition of the invention, a thermoplastic elastomer comprising a thermoplastic polyurethane block may be used as the thermoplastic elastomer (A). The thermoplastic elastomer comprising a thermoplastic polyurethane block is produced, for example, by melt-kneading a thermoplastic polyurethane elastomer with a thermoplastic elastomer comprising an aromatic vinyl compound polymer block terminated with a hydroxyl group and a conjugated diene polymer block to allow them to react with each other, and by recovering the resultant thermoplastic elastomer from the reaction product by a known extraction method. The thermoplastic polyurethane is preferably a polyester-based polyurethane and more preferably a polyester-based polyurethane having a soft segment composed of an aliphatic polyester. The thermoplastic polyurethanes of "Kuramiron" (registered trademark) series available from Kuraray Co., Ltd. are usable.

The mixing ratio, i.e., thermoplastic elastomer (A) before melt-kneading/thermoplastic polyurethane by mass, is preferably 20/80 to 80/20, more preferably 30/70 to 70/30, and still more preferably 40/60 to 60/40.

Polyvinyl Acetal Resin (B)

The polyvinyl acetal resin (B) enhances the adhesion of the thermoplastic polymer composition and is generally dispersed in the thermoplastic polymer composition in island forms. By the use of the polyvinyl acetal resin (B), the thermoplastic polymer composition is firmly adhered to an adherend, such as ceramics, metals, and synthetic resins, without treating its surface with a primer.

The polyvinyl acetal resin (B) is generally a resin comprising the repeating units represented by formula (I);

In formula (I), n represents the number of types of aldehydes used in acetalization; each of $R_1, R_2, \ldots,$ and $R_n$ represents an alkyl group or a hydrogen atom in each aldehyde used in acetalization; each of $k_{(1)}, k_{(2)}, \ldots,$ and $k_{(n)}$ represents the proportion (molar ratio) of the constitutional unit in [ ]; l represents the proportion (molar ratio) of vinyl alcohol units; and m represents the proportion (molar ratio) of vinyl acetate units, provided that $k_{(1)}+k_{(2)}+\ldots+k_{(n)}+l+m=1$ and any of $k_{(1)}, k_{(2)}, \ldots, k_{(n)}$, l, and m can be zero.

The repeating units are not necessarily distributed in the above sequence and may be distributed in a random fashion, a block fashion, or a tapered fashion.

Production of Polyvinyl Acetal Resin (B)

The polyvinyl acetal resin (B) is produced, for example, by the reaction of a polyvinyl alcohol and an aldehyde.

The average degree of polymerization of the polyvinyl alcohol for the production of the polyvinyl acetal resin (B) is preferably 100 to 4,000, more preferably 100 to 3,000, still more preferably 100 to 2,000, and further preferably 250 to 2,000. If being 100 or more, the polyvinyl acetal resin (B) is easily produced and handled. If being 4,000 or less, the melt viscosity of the resultant polyvinyl acetal resin (B) is not excessively high during the melt kneading, to facilitate the production of the thermoplastic polymer composition of the invention.

The average degree of polymerization of polyvinyl alcohol referred to herein is determined according to the method of JIS K 6726, specifically, determined from the intrinsic viscosity measured in water at 30° C. after resaponification of polyvinyl alcohol and purification.

The production method of the polyvinyl alcohol is not particularly limited and the polyvinyl alcohol which is produced, for example, by saponifying polyvinyl acetate with alkali, acid, or ammonia is usable. Commercially available products, for example, "Kuraray Poval" series available from Kuraray Co., Ltd., are also usable. The polyvinyl alcohol may be saponified completely or partly. The degree of saponification is preferably 80% by mole or more, more preferably 90% by mole or more, and still more preferably 95% by mole or more.

Also usable as the polyvinyl alcohol includes a copolymer of vinyl alcohol and a monomer copolymerizable with vinyl alcohol, for example, an ethylene-vinyl alcohol copolymer and a partly saponified ethylene-vinyl alcohol copolymer. A modified polyvinyl alcohol which is partly introduced with a carboxylic acid is also usable. The above polyvinyl alcohol may be used singly or in combination of two or more.

The aldehyde used for the production of the polyvinyl acetal resin (B) is not particularly limited, and examples thereof include formaldehyde (inclusive of paraformaldehyde), acetaldehyde (inclusive of paraacetaldehyde), propionaldehyde, n-butylaldehyde, isobutylaldehyde, pentanal, hexanal, heptanal, n-octanal, 2-ethylhexyl aldehyde, cyclohexanecarbaldehyde, furfural, glyoxal, glutaraldehyde, benzaldehyde, 2-methylbenzaldehyde, 3-methylbenzaldehyde, 4-methylbenzaldehyde, p-hydroxybenzaldehyde, m-hydroxybenzaldehyde, phenylacetaldehyde, and β-phenylpropionaldehyde. These aldehydes may be used singly or in combination of two or more. Of the above aldehyde, butylaldehyde is preferred and n-butylaldehyde is more preferred in view of easiness of production.

The polyvinyl acetal resin (B) produced by the acetalization using butylaldehyde is particularly referred to as "polyvinyl butyral (PVB)."

In the polyvinyl acetal resin (B), the content of butyral units in acetal units (see the formula below) is preferably 0.8 or more, more preferably 0.9 or more, still more preferably 0.95 or more, and particularly preferably approximate to 1.

For example, in the polyvinyl acetal resin (B) represented by formula (I) wherein only $R_1$ represents $C_3H_7$, the content is represented preferably by the formula: $0.8 \le k_{(1)}/(k_{(1)} + k_{(2)} + \ldots + k_{(n)})$.

The degree of acetalization of the polyvinyl acetal resin (B) is preferably 55 to 88% by mole. Polyvinyl acetal resin (B) having a degree of acetalization of 55% by mole or more is produced at lower costs, easily available, and melt-processed easily. Polyvinyl acetal resin (B) having a degree of acetalization of 88% by mole or less is economical, because which is produced very easily without requiring a long-term acetalization.

The degree of acetalization of the polyvinyl acetal resin (B) is more preferably 60 to 88% by mole, still more preferably 70 to 88% by mole, and particularly preferably 75 to 85% by mole. In view of adhesion to ceramics, metals and synthetic resins, it is advantageous for the polyvinyl acetal resin (B) to have a low degree of acetalization, because the content of hydroxyl groups increases with decreasing degree of acetalization. However, within the above ranges, the affinity and compatibility with the thermoplastic elastomer (A) is good, the mechanical properties of the resultant thermoplastic polymer composition are excellent, and the adhesion strength to ceramics, metals, and synthetic resins is high.

The degree of acetalization (% by mole) of the polyvinyl acetal resin (B) is defined by the following formula:

Degree of acetalization(% by mole)=$\{k_{(1)} + k_{(2)} + \ldots + k_{(n)}\} \times 2/\{\{k_{(1)} + k_{(2)} + \ldots + k_{(n)}\} \times 2 + l + m\} \times 100$ wherein n, $k_{(1)}, k_{(2)}, \ldots, k_{(n)}$, l, and m are as defined above.

The degree of acetalization of the polyvinyl acetal resin (B) is determined in line with the method of JIS K 6728 (1977). Specifically, the ratio ($k_0$) of the vinyl acetal unit by mass is calculated from the formula: $k_0 = 1 - l_0 - m_0$, wherein $l_0$ is the ratio of the vinyl alcohol unit by mass and $m_0$ is the ratio of the vinyl acetate unit by mass, each determined by titration. Then, the molar ratio l of the vinyl alcohol unit is calculated from the formula: $l = (l_0/44.1)/(l_0/44.1 + m_0/86.1 + 2k_0/Mw(acetal))$, and the molar ratio m of the vinyl acetate unit from the formula: $m = (m_0/86.1)/(l_0/44.1 + m_0/86.1 + k_0/Mw(acetal))$. Then, the molar ratio of the vinyl acetal unit ($k = k_{(1)} + k_{(2)} + \ldots + k_{(n)}$) is calculated from the formula: $k = 1 - l - m$. In the above formulae, Mw(acetal) is the molecular weight of a single vinyl acetal unit. For example, Mw(acetal) is Mw(butyral)=142.2 for polyvinyl butyral. Finally, the degree of acetalization (% by mole) is calculated from the formula: $\{k_{(1)} + k_{(2)} + \ldots + k_{(n)}\} \times 2/\{\{k_{(1)} + k_{(2)} + \ldots + k_{(n)}\} \times 2 + l + m\} \times 100$.

The degree of acetalization of the polyvinyl acetal resin (B) can be also calculated from the results of $^1$H-NMR or $^{13}$C-NMR using a solution of the polyvinyl acetal resin (B) in an appropriate deuterated solvent, such as deuterated dimethyl sulfoxide In the polyvinyl acetal resin (B), the content of the vinyl alcohol unit is preferably 17 to 45% by mole ($0.17 \le l \le 0.45$) and the content of the vinyl acetate unit is preferably 0 to 5% by mole ($0 \le m \le 0.05$), more preferably 0 to 3% by mole ($0 \le m \le 0.03$).

The reaction between the polyvinyl alcohol and the aldehyde (acetalization) can be conducted by a known method, for example, an aqueous solvent method in which an aqueous solution of the polyvinyl alcohol and the aldehyde are subjected to acetalization in the presence of an acid catalyst to precipitate the particles of the polyvinyl acetal resin (B), or a solvent method in which a dispersion of the polyvinyl alcohol in an organic solvent is subjected to acetalization with the aldehyde in the presence of an acid catalyst and then a poor solvent to the polyvinyl acetal resin (B), such as water, is added to the resultant reaction mixture to precipitate the polyvinyl acetal resin (B).

The acid catalyst is not particularly limited and examples thereof include organic acids, such as acetic acid and p-toluenesulfonic acid; inorganic acids, such as nitric acid, sulfuric acid, and hydrochloric acid; gaseous materials, such as carbon dioxide, which exhibit acidity when dissolved in water; and solid acid catalysts, such as cation exchange resin and metal oxide.

The slurry obtained in the aqueous solvent method and the solvent method is generally acidic because of the acidic catalyst contained therein. The acidity is reduced by a method in which the pH value is adjusted to preferably 5 to 9, more preferably 6 to 9, and still more preferably 6 to 8 by repeated washing with water; a method in which the pH value is adjusted to preferably 5 to 9, more preferably 6 to 9, and still more preferably 6 to 8 by adding a neutralizing agent; or a method of adding an alkylene oxide to the slurry.

Examples of the compound for adjusting the pH value include alkali metal hydroxides, such as sodium hydroxide and potassium hydroxide; alkali metal acetate, such as sodium acetate; alkali metal carbonates, such as sodium carbonate and potassium carbonate; alkali metal hydrogencarbonates, such as sodium hydrogencarbonate; and ammonia or aqueous ammonia solution. Examples of the alkylene oxide include ethylene oxide, propylene oxide, and glycidyl ethers, such as ethylene glycol diglycidyl ether.

Next, the salt generated by neutralization, the residual non-reacted aldehyde, etc. are removed.

The method for removal is not particularly limited and generally conducted by repeating dehydration and washing with water. The water-containing polyvinyl acetal resin (B) after removing the residues is, if necessary, dried and then, if necessary, made into powder, granule, or pellet.

The polyvinyl acetal resin (B) to be used in the invention is preferably deaerated under reduced pressure to reduce the content of the residual aldehyde and water when made into powder, granule, or pellet.

The thermoplastic polymer composition of the invention contains 1 to 100 parts by mass of the polyvinyl acetal resin (B) per 100 parts by mass of the thermoplastic elastomer (A). If the content of the polyvinyl acetal resin (B) is less than 1 part by mass, sufficient adhesion to ceramics, metals, and synthetic resins is difficult to obtain. If exceeding 100 parts by mass, the thermoplastic polymer composition becomes hard to make it difficult to exhibit flexibility and mechanical properties, although adhesion is sufficient. The lower content of the polyvinyl acetal resin (B) is preferably 5 parts by mass or more, more preferably 10 parts by mass or more, still more preferably 20 parts by mass or more, and particularly preferably 25 parts by mass or more, and the upper content is more preferably 70 parts by mass or less, still more preferably 50 parts by mass or less, and particularly preferably 45 parts by mass or less, each based on 100 parts by mass of the thermoplastic elastomer (A). In another aspect of the invention, the content of the polyvinyl acetal resin (B) is preferably 1 to 70 parts by mass, more preferably 5 to 70 parts by mass, still more preferably 10 to 70 parts by mass, further preferably 10 to 50 parts by mass, still further preferably 20 to 50 parts by mass, and particularly preferably 25 to 45 parts by mass, each based on 100 parts by mass of the thermoplastic elastomer (A).

Polar Group-Containing Olefin-Based Copolymer (C)

The polar group-containing olefin-based copolymer (C) imparts good moldability to the thermoplastic polymer composition of the invention and makes the thermoplastic polymer composition to adhere well to ceramics, metals, and synthetic resins even by the heat treatment at 190° C. or lower.

Figure 1:
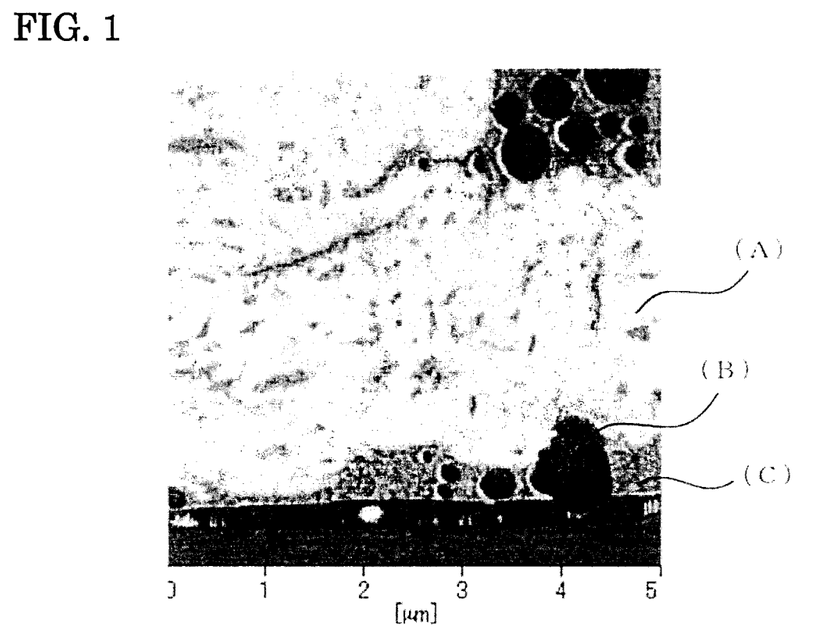
FIG. 1 is an image of atomic force microscope (AFM) showing the cross-section of the sheet obtained in Example 5.
Figure 2:
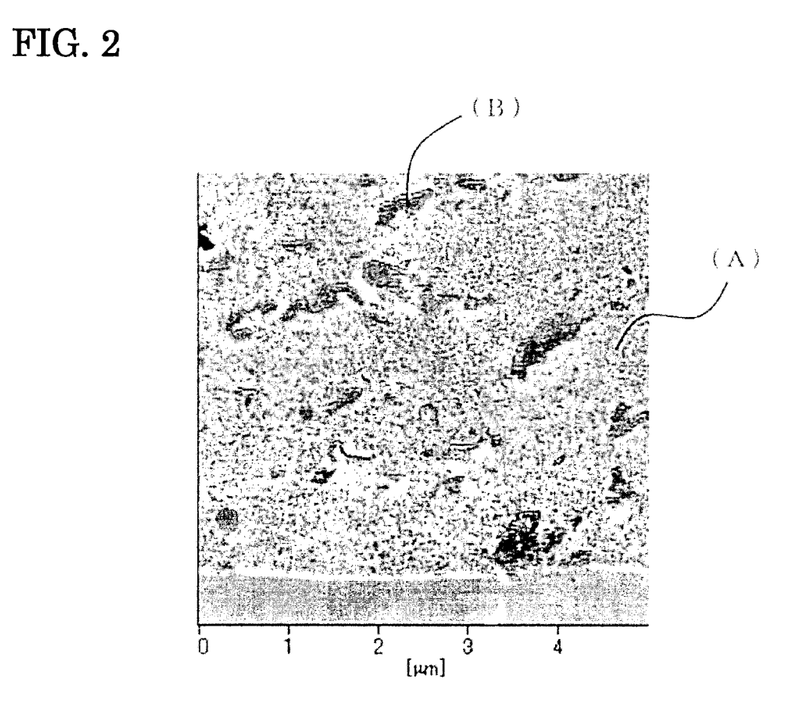
FIG. 2 is an image of atomic force microscope (AFM) showing the cross-section of the sheet obtained in Comparative Example 1.

These effects of the component (C) have not been fully elucidated and can be attributed to the dispersed state of the components (A) to (D) throughout the thermoplastic polymer composition as shown in FIG. 1. As seen from FIG. 1, the polyvinyl acetal resin (B) is widely distributed to the surface of the composition. In addition, since the bonding between the component (A) and the component (C) and the bonding between the component (B) and the component (C) are high, the failure at interface between the components does not occur during peeling operation. The effects peculiar to the invention can be the result of these features. FIG. 2 is an atomic force microscope (AFM) image showing a cross-sectional view of a sheet of a thermoplastic polymer composition containing the component (A), (B), and (D) without the polar group-containing olefin-based copolymer (C). As seen from FIG. 2, although inside the sheet the polyvinyl acetal resin (B) is distributed in the thermoplastic elastomer (A) in island forms, it is sparsely distributed in the surface portion, failing to exhibit the effects peculiar to the invention. Examples of the polar group of the polar group-containing olefin-based copolymer (C) include an ester group, a hydroxyl group, an amide group, and a halogen atom, such as chlorine atom.

The polar group-containing olefin-based copolymer (C) is preferably an olefin-based copolymer of a copolymerizable olefin monomer and a copolymerizable polar group-containing monomer. Examples of the copolymerizable olefin monomer include ethylene, propylene, 1-butene, 1-pentene, 1-hexene, 1-octene, 4-methyl-1-pentene, and cyclohexene. These copolymerizable olefin monomers may be used alone or in combination of two or more. Of the above, preferred are ethylene and propylene and more preferred is ethylene. Examples of the copolymerizable polar group-containing monomer include a (meth)acrylic ester, (meth)acrylic acid, vinyl acetate, vinyl chloride, ethylene oxide, propylene oxide, and acrylamide. These copolymerizable polar group-containing monomers may be used alone or in combination of two or more. Of the above, preferred is a (meth)acrylic ester.

Preferred examples of the (meth)acrylic ester as the copolymerizable polar group-containing monomer include alkyl acrylates, such as methyl acrylate, ethyl acrylate, n-propyl acrylate, isopropyl acrylate, n-butyl acrylate, isobutyl acrylate, n-hexyl acrylate, isohexyl acrylate, n-octyl acrylate, isooctyl acrylate, and 2-ethylhexyl acrylate; and alkyl methacrylates, such as methyl methacrylate, ethyl methacrylate, n-propyl methacrylate, isopropyl methacrylate, n-butyl methacrylate, isobutyl methacrylate, n-hexyl methacrylate, isohexyl methacrylate, n-octyl methacrylate, isooctyl methacrylate, and 2-ethylhexyl methacrylate. These (meth)acrylic esters may be used alone or in combination of two or more. Of the above, preferred are alkyl acrylates, more preferred are methyl acrylate and ethyl acrylate, and still more preferred is methyl acrylate, because high adhesion strength is obtained even by the heat treatment at 190° C. or lower.

The polymerization fashion of the polar group-containing olefin-based copolymer (C) is not particularly limited, and a random polymer and a block copolymer are usable, with the random copolymer being preferred.

The polar group of the polar group-containing olefin-based copolymer (C) may be modified after the polymerization. For example, the (meth)acrylic acid unit may be neutralized by metal ion to convert into an ionomer and the vinyl acetate unit may be hydrolyzed.

The melt flow rate (MFR) of the polar group-containing olefin-based copolymer (C) is preferably 0.1 to 100 g/10 min, more preferably 0.1 to 70 g/10 min, still more preferably 0.1 to 50 g/10 min, further preferably 1 to 30 g/10 min, still further preferably 1 to 20 g/10 min, and particularly preferably 1 to 10 g/10 min, when measured at 190° C. under a load of 2.16 kg (21.18 N). If being 0.1 g/10 min or more, sufficient adhesion strength is obtained even by the heat treatment at 190° C. or lower. If being 100 g/10 min or less, the polar group-containing olefin-based copolymer (C) is easily available and enhances the mechanical properties of the resultant composition.

Vicat softening point of the polar group-containing olefin-based copolymer (C) is preferably 40 to 100° C., more preferably 45 to 95° C., still more preferably 45 to 75° C., further preferably 45 to 65° C., and particularly preferably 45 to 55° C. If being 40° C. or higher, the mechanical properties of the thermoplastic polymer composition are good. If being 100° C. or lower, high adhesion strength is obtained even by the heat treatment at 190° C. or lower.

The content of the polar group-containing constitutional unit in the polar group-containing olefin-based copolymer (C) is preferably 1 to 99% by mass, more preferably 1 to 50% by mass, still more preferably 1 to 40% by mass, and particularly preferably 5 to 30% by mass, each based on the total constitutional units of the polar group-containing olefin-based copolymer (C). Within the above ranges, the affinity and compatibility of the polar group-containing olefin-based copolymer (C) with the thermoplastic elastomer (A) and also with the polyvinyl acetal resin (B) are good, thereby making the mechanical properties of the thermoplastic polymer composition good, the adhesion to ceramics, metals and synthetic resins high, and the adhesion strength high even by the heat treatment at 190° C. or lower.

The mechanical properties of the thermoplastic polymer composition tends to be lowered with decreasing content of the polar group-containing constitutional unit, and the affinity and compatibility with the thermoplastic elastomer (A) tends to be reduced with increasing content of the polar group-containing constitutional unit.

The thermoplastic polymer composition of the invention contains 5 to 100 parts by mass of the polar group-containing olefin-based copolymer (C) per 100 parts by mass of the thermoplastic elastomer (A). If less than 5 parts by mass, it is difficult to adhere the thermoplastic polymer composition to ceramics, metals, or synthetic resins by the heat treatment at 190° C. or lower. If exceeding 100 parts by mass, the thermoplastic polymer composition becomes hard, thereby failing to have good flexibility and mechanical properties, although a sufficient adhesion is obtained. The content of the polar group-containing olefin-based copolymer (C) is preferably 10 parts by mass or more, more preferably 20 parts by mass or more, still more preferably 35 parts by mass or more, and preferably 70 parts by mass or less, and more preferably 60 parts by mass or less, each based on 100 parts by mass of the thermoplastic elastomer (A).

In another aspect, the content of the polar group-containing olefin-based copolymer (C) is preferably 5 to 70 parts by mass, more preferably 10 to 70 parts by mass, still more preferably 20 to 70 parts by mass, and particularly preferably 35 to 60 parts by mass, each base on 100 parts by mass of the thermoplastic elastomer (A).

Softener (D)

Softeners generally used for rubbers and plastics are usable as the softener (D) to be used in the thermoplastic polymer composition of the invention.

Examples thereof include paraffin-type, naphthene-type, or aromatic-type process oils; phthalic acid derivatives, such as dioctyl phthalate and dibutyl phthalate; white oils; mineral oils; ethylene-α-olefin oligomers; paraffin waxes; liquid paraffins; polybutene; low molecular weight polybutadiene; and low molecular weight polyisoprene, with process oils being preferred and paraffin-type process oils being more preferred.

Also usable are known softeners which are generally used in combination with polyvinyl acetal resins, for example, organic acid ester-type plasticizer, such as esters of monobasic organic acids or polybasic organic acids; and phosphoric acid-type plasticizer, such as organophosphoric esters and organophosphorous esters.

Examples of the esters of monobasic organic acids include glycol esters, such as triethylene glycol dicaproate, triethylene glycol di-2-ethyllactate, triethylene glycol di-n-octanoate, and triethylene glycol di-2-ethylhexanoate, which are obtained by the reaction between a glycol, such as triethylene glycol, tetraethylene glycol, and tripropylene glycol, and a monobasic organic acid, such as butyric acid, isobutyric acid, caproic acid, 2-ethylbutyric acid, heptylic acid, n-octylic acid 2-ethylhexylic acid, pelargonic acid (n-nonylic acid), and decylic acid.

Examples of the esters of polybasic organic acids include esters of a polybasic organic acid, such as adipic acid, sebacic acid, and azelaic acid, and a linear or branched alcohol, for example, dibutyl sebacate, dioctyl azelate, and dibutylcarbitol adipate Examples of the organophosphoric esters include tributoxyethyl phosphate, isodecylphenyl phosphate, and triisopropyl phosphate.

The softeners (D) exemplified above may be used alone or in combination of two or more.

The thermoplastic polymer composition contains 0.1 to 300 parts by mass of the softener (D) per 100 parts by mass of the thermoplastic elastomer (A). If less than 0.1 part by mass, the flexibility and moldability of the thermoplastic polymer composition are reduced. The content is preferably 1 part by mass or more, more preferably 10 parts by mass or more, and still more preferably 50 parts by mass or more. If exceeding 300 parts by mass, the mechanical properties and the adhesion to ceramics, metals, and synthetic resins are reduced. The content is preferably 200 parts by mass or less and more preferably 150 parts by mass or less.

In another aspect, the content of the softener (D) is preferably 1 to 200 parts by mass, more preferably 10 to 200 parts by mass, still more preferably 50 to 200 parts by mass, and particularly preferably 50 to 150 parts by mass, each based on 100 parts by mass of the thermoplastic elastomer (A).

Other Optional Component

The thermoplastic polymer composition may further contain another thermoplastic polymer, such as olefin-type polymer, styrene-type polymer, polyphenylene ether-type resin, and polyethylene glycol, as long as the effects of the invention are not adversely affected. Particularly, the olefin-type polymer improves the moldability and mechanical properties of the thermoplastic polymer composition. Examples of such olefin-type polymer include polyethylene, polypropylene, polybutene, and a block copolymer or a random copolymer of propylene with α-olefin, such as ethylene and 1-butene, which may be used alone or in combination of two or more.

The content of another thermoplastic polymer is preferably 100 parts by mass or less, more preferably 50 parts by mass or less, still more preferably 20 parts by mass or less, and further preferably 10 parts by mass or less, each based on 100 parts by mass of the thermoplastic elastomer (A).

The thermoplastic polymer composition may contain inorganic filler, if necessary. The inorganic filler is effective for improving the properties of the thermoplastic polymer composition, such as heat resistance and weatherability, regulating hardness, and reducing production costs by its bulking nature. Examples of the inorganic filler include calcium carbonate, talc, magnesium hydroxide, aluminum hydroxide, mica, clay, natural silicic acid, synthetic silicic acid, titanium oxide, carbon black, barium sulfate, glass balloon, and glass fiber, although not limited thereto. These inorganic fillers may be used alone or in combination of two or more.

The inorganic filler is used preferably in an amount not to reduce the flexibility of the thermoplastic polymer composition, and the content thereof is preferably 100 parts by mass or less, more preferably 70 parts by mass or less, still more preferably 30 parts by mass or less, and particularly preferably 10 parts by mass or less, each based on 100 parts by mass of the thermoplastic elastomer (A).

The thermoplastic polymer composition may contain a tackifying resin as long as the effects of the invention are not adversely affected. Examples of the tackifying resin include rosin-type resin, terpene phenol-type resin, terpene resin, aromatic hydrocarbon-modified terpene resin, aliphatic petroleum resin, alicyclic petroleum resin, aromatic petroleum resin, coumarone-indene resin, phenol-type resin, and xylene resin.

The tackifying resin is used preferably in an amount not to reduce the mechanical properties of the thermoplastic polymer composition, and the content thereof is preferably 100 parts by mass or less, more preferably 70 parts by mass or less, still more preferably 30 parts by mass or less, and particularly preferably 10 parts by mass or less, each based on 100 parts by mass of the thermoplastic elastomer (A).

The thermoplastic polymer composition may further contain, if necessary, antioxidant, lubricant, light stabilizer, processing aid, colorant, such as pigment and dye, flame retardant, antistatic agent, delustering agent, silicone oil, antiblocking agent, ultraviolet absorber, mold release agent, foaming agent, antibacterial agent, anti-mold agent, and perfume, as long as the effects of the invention are not adversely affected.

Examples of the antioxidant include hindered phenol-type antioxidant, phosphorus-type antioxidant, lactone-type antioxidant, and hydroxyl-type antioxidant, with the hindered phenol-type antioxidant being preferred. The antioxidant is used preferably in an amount not to discolor the thermoplastic polymer composition during melt kneading, and the content thereof is preferably 0.1 to 5 parts by mass based on 100 parts by mass of the thermoplastic elastomer (A).

The production method of the thermoplastic polymer composition is not particularly limited.

Any production method is usable as long as the components of the thermoplastic polymer composition mentioned above are uniformly mixed, and generally, a melt kneading method is used, in which the components are melt-kneaded in a melt-kneading machine, such as single-screw extruder, twin-screw extruder, kneader, batch mixer, roller, and Banbury mixer, preferably at 170 to 270° C., thereby obtaining the thermoplastic polymer composition.

The hardness of the thermoplastic polymer composition measured according to JIS-A method of JIS K 6253 (also referred to as "type A hardness") is preferably 93 or less, more preferably 30 to 85, still more preferably 40 to 75, and particularly preferably 40 to 60. If type A hardness is excessively high, good flexibility, elasticity, and mechanical properties are difficult to obtain, and the resultant thermoplastic polymer composition fails to exhibit excellent adhesion to synthetic resins, ceramics, and metals, particularly resins containing inorganic filler, such as glass fibers. Type A hardness referred to herein is measured according to JIS K 6253.

Molded Product

The present invention further provides molded products obtained by using the thermoplastic polymer composition.

The thermoplastic polymer composition of the invention is excellent in moldability and is made into molded products with various shapes. The molded product may be sheet or film.

The thermoplastic polymer composition can be formed into molded products by various processing methods which are generally used for forming known thermoplastic polymer compositions, for example, by any of injection molding method, extrusion method, press molding method, blow molding method, calender method, and casting method. T-die method, calender method, inflation method, and belt method which are generally known are usable in film or sheet formation.

In a preferred embodiment of the invention, the molded product comprises the thermoplastic polymer composition which is adhered to at least one material selected from ceramics, metals, and synthetic resins, or the molded product comprises the thermoplastic polymer composition which is adhered between the same kind of material selected from ceramics, metals, and synthetic resins or between at least two kinds of materials selected from ceramics, metals, and synthetic resins, with a molded product comprising the thermoplastic polymer composition which is adhered to at least one material selected from ceramics and metals being particularly preferred. The adhesion strength of the thermoplastic polymer composition in the molded product is preferably 20 N/25 mm or more, because the peeling by human hands is generally difficult. If less than 20 N/25 mm, the adhesion strength is insufficient for practical use, because easily peeled with slight resistance. The adhesion strength is measured according to JIS K 6854-2 described below in the example portion.

The thermoplastic polymer composition of the invention is excellent in flexibility, mechanical properties, and moldability and adhered to ceramics, metals, and synthetic resins by a heat treatment at 190° C. or lower without a priming treatment. Therefore, in the production of a molded product, the thermoplastic polymer composition is sufficiently adhered to at least one material selected from ceramics, metals, and synthetic resins even when the surface of the thermoplastic polymer composition ejected from an injection molding machine or an extruder is cooled to 190° C. or lower, thereby making it possible to use the existing machine without using an additional heater. Further, members made of various kinds of synthetic resins are not molten or deformed at 190° C. or lower, the damage of the members made of synthetic resins around the adhering portion by heating is avoided.

The ceramics for use in the molded product is a nonmetallic inorganic material, such as metal oxides, metal carbides, and metal nitrides, for example, glass, cement, alumina, zirconia, zinc oxide ceramics, barium titanate, lead zirconate titanate, silicon carbide, silicon nitride, and ferrite.

The metal for use in the molded product includes, for example, iron, copper, aluminum, magnesium, nickel, chromium, zinc, and alloys of these metals. A material having a metallic surface formed by copper plating, nickel plating, chromium plating, tin plating, zinc plating, platinum plating, gold plating, or silver plating is also usable.

The synthetic resin for use in the molded product include, for example, polyamide resin, polyester resin, polycarbonate resin, polyphenylene sulfide resin, (meth)acrylonitrile-butadiene-styrene resin, (meth)acrylonitrile-styrene resin, (meth)acrylic ester-butadiene-styrene resin, (meth)acrylic ester-styrene resin, butadiene-styrene resin, epoxy resin, phenol resin, diallyl phthalate resin, polyimide resin, melamine resin, polyacetal resin, polysulfone resin, polyether sulfone resin, polyether imide resin, polyphenylene ether resin, polyarylate resin, polyether ether ketone resin, polystyrene resin, syndiotactic polystyrene resin, and polyolefin resin. These resins may be used alone or in combination of two or more.

The synthetic resin mentioned above may contain inorganic filler, such as calcium carbonate, talc, magnesium hydroxide, aluminum hydroxide, mica, clay, natural silicic acid, synthetic silicic acid, titanium oxide, carbon black, barium sulfate, glass fiber, and glass balloon. These inorganic fillers may be used alone or in combination of two or more. Of the above, glass fiber is preferred.

The inorganic filler is blended preferably in an amount not to deteriorate the moldability and mechanical strength of the resin blended with the inorganic filler, and the content thereof is preferably 0.1 to 100 parts by mass, more preferably 1 to 50 parts by mass, and still more preferably 3 to 40 parts by mass, each based on 100 parts by mass of the synthetic resin.

The production method of the molded product comprising the thermoplastic polymer composition adhered to the ceramic or metal is not particularly limited and any method can be employed as long as the thermoplastic polymer composition is fuse-bonded to ceramic and metal. For example, an injection insert method, an extrusion lamination method, a press molding method, and a melt casting method are usable.

In the production of an adhered molded product by the injection insert method, a glass plate with a given shape and a given dimension is place in a mold and then the thermoplastic polymer composition is injected into the mold. In the production of an adhered molded product by the extrusion lamination method, a molten thermoplastic polymer composition is extruded directly onto the surface or edge of a glass plate with a given shape and a given dimension from a die with a given shape which is disposed on an extruder. In the production of an adhered molded product by the press molding method, the thermoplastic polymer composition is formed into a molded product by injection molding or extrusion and then the obtained molded product is heat-pressed to a glass plate with a given shape and a given dimension by a press molding machine. The surface not adhered to the glass plate may be covered with a layer of a non-polar resin, such as olefin resin and cyclic olefin resin, for protection or decoration.

The production method of the molded product comprising the thermoplastic polymer composition adhered to the synthetic resin mentioned above is not particularly limited. The molded product can be produced by co-extruding or co-injecting a molten composition and a molten resin, or by forming one of the composition or the resin into a molded product and then fuse-coating or solution-coating the other on the obtained molded product. In addition, a two-color forming method and an insert molding method are usable.

The thermoplastic polymer composition of the invention is widely applicable to the production of the molded product mentioned above. The shape, structure, and use of the molded product made from the thermoplastic polymer composition of the invention are not particularly limited, and the present invention includes any of structures as long as comprising the thermoplastic polymer composition of the invention which is adhered to ceramics, metals or synthetic resins.

Synthetic resins, synthetic resins blended with glass fiber, and light metals, such as aluminum alloy and magnesium alloy, have been used as the housing material of electronic or electric appliances, OA equipments, household appliances, and automotive parts. The molded product having the thermoplastic polymer composition of the invention adhered is applicable to such housing material. Specifically, the molded product is bonded to the housing of large-sized display, notebook computer, mobile phone, PHS, PDA (personal digital assistant, such as electric organizer), electronic dictionary, video camera, digital still camera, portable radio cassette player, and inverter to work as a shock absorber, a non-slip coating, a waterproof material or a decorative material.

The thermoplastic polymer composition is also useful in a wide application as a molded product or structural member to be adhered to glass, for example, a window molding or gasket for automobiles and buildings, a sealant for glass, and an anti-corrosion material. The thermoplastic polymer composition is further useful for adhesively joining glass with aluminum sash or metal openings of windows of automobiles and buildings or adhesively joining glass with metal frame of photovoltaic modules. The thermoplastic polymer composition is further useful as the separator of rechargeable batteries for use in personal digital assistants, such as notebook computer, mobile phone, and video camera, hybrid vehicle, and fuel cell vehicle.

The thermoplastic polymer composition of the invention is suitably used as an adhesive. As shown in the following examples, since the thermoplastic polymer composition exhibits good adhesiveness to any of ceramics, metals, and synthetic resins, it is useful as an adhesive for bonding not only the same material but also different materials. In addition, since the thermoplastic polymer composition is flexible, the adhesive can reduce the defect due to the difference in the coefficient of thermal expansion between different materials.

EXAMPLES

The present invention is described below in more detail with reference to the examples. However, it should be noted that the scope of the present invention is not limited thereto.

The thermoplastic elastomer (A), the polyvinyl acetal resin (B), the polar group-containing olefin-based copolymer (C), and the softener (D) mentioned below were used in the following examples and comparative examples.

Styrene-Type Thermoplastic Elastomer (A1)

Into a dried pressure vessel purged with nitrogen, 80 L of cyclohexane solvent and 0.17 L of sec-butyllithium initiator (10% by mass solution in cyclohexane) were charged. After raising the temperature to 50° C., 3.9 L of styrene was added to allow the polymerization to proceed for 3 h. Then, the polymerization was allowed to proceed for 4 h after adding a mixed liquid of 12.1 L of isoprene and 10.9 L of butadiene and further for 3 h after adding 3.9 L of styrene. The resultant reaction liquid was poured into 80 L of methanol, and the precipitated solid matter was separated by filtration and dried at 50° C. for 20 h, to obtain a polystyrene block-poly(isoprene/butadiene) block-polystyrene block, triblock copolymer.

Then, 20 kg of the obtained triblock copolymer was dissolved in 200 L of cyclohexane. After adding a palladium carbon hydrogenation catalyst (content of carried palladium: 5% by mass) in an amount of 5% by mass of the copolymer, the reaction was allowed to proceed for 10 h at 150° C. under a hydrogen pressure of 2 MPa. After allowing the reaction production mixture to cool and releasing the pressure, the palladium carbon was removed by filtration. The filtrate was condensed and vacuum-dried to obtain a hydrogenated product of the triblock copolymer (hereinafter referred to as "thermoplastic elastomer (A1)"). The obtained thermoplastic elastomer (A1) had a weight average molecular weight of 170,000, a styrene content of 32% by mass, a degree of hydrogenation of 97%, a molecular weight distribution of 1.04, and a 1,4-bonding content of 95% by mole.

Styrene-Type Thermoplastic Elastomer (A2)

Into a dried pressure vessel purged with nitrogen, 80 L of cyclohexane solvent and 0.34 L of sec-butyllithium initiator (10% by mass solution in cyclohexane) were charged. After raising the temperature to 50° C., 4.0 L of styrene was added to allow the polymerization to proceed for 3 h. Then, the polymerization was allowed to proceed for 4 h after adding a mixed liquid of 14.2 L of isoprene and 11.6 L of butadiene and further for 3 h after adding 4.0 L of styrene. The resultant reaction liquid was poured into 80 L of methanol, and the precipitated solid matter was separated by filtration and dried at 50° C. for 20 h, to obtain a polystyrene block-poly(isoprene/butadiene) block-polystyrene block, triblock copolymer.

Then, 20 kg of the obtained triblock copolymer was dissolved in 200 L of cyclohexane. After adding a palladium carbon hydrogenation catalyst (content of carried palladium: 5% by mass) in an amount of 5% by mass of the copolymer, the reaction was allowed to proceed for 10 h at 150° C. under a hydrogen pressure of 2 MPa. After allowing the reaction production mixture to cool and releasing the pressure, the palladium carbon was removed by filtration. The filtrate was condensed and vacuum-dried to obtain a hydrogenated product of the triblock copolymer (hereinafter referred to as "thermoplastic elastomer (A2)"). The obtained thermoplastic elastomer (A2) had a weight average molecular weight of 100,000, a styrene content of 30% by mass, a degree of hydrogenation of 97%, a molecular weight distribution of 1.02, and a 1,4-bonding content of 95% by mole.

Polyvinyl Acetal Resin (B1)

Into an aqueous solution of a polyvinyl alcohol resin having an average degree of polymerization of 500 and a degree of saponification of 99% by mole, n-butylaldehyde and an acid catalyst (hydrochloric acid) were added. The acetalization was conducted under stirring. The precipitated resin was washed by a known method until the pH value reached 6. Then, the resin was suspended in an aqueous alkaline medium and post-treated under stirring. The resultant resin was washed until the pH value reached 7 and dried until the volatile component was reduced to 0.3%, to obtain a polyvinyl acetal resin (B1) having a degree of acetalization of 80% by mole.

Polyvinyl Acetal Resin (B2)

Into an aqueous solution of a polyvinyl alcohol resin having an average degree of polymerization of 1000 and a degree of saponification of 99% by mole, n-butylaldehyde and an acid catalyst (hydrochloric acid) were added. The acetalization was conducted under stirring. The precipitated resin was washed by a known method until the pH value reached 6. Then, the resin was suspended in an aqueous alkaline medium and post-treated under stirring. The resultant resin was washed until the pH value reached 7 and dried until the volatile component was reduced to 0.3%, to obtain a polyvinyl acetal resin (B2) having a degree of acetalization of 80% by mole.

Polar Group-Containing Olefin-Based Copolymer (C1)

Ethylene-methyl acrylate copolymer "Elvaloy (registered trademark) AC 1820AC" manufactured by Du Pont-Mitsui Polychemicals Co., Ltd. having a methyl acrylate content of 20% by mass, MFR (190° C. under a load of 2.16 kg (21.18 N)) of 8 g/10 min, and Vicat softening point of 54° C.

Polar Group-Containing Olefin-Based Copolymer (C2)

Ethylene-methyl acrylate copolymer "Elvaloy (registered trademark) AC 1609AC" manufactured by Du Pont-Mitsui Polychemicals Co., Ltd. having a methyl acrylate content of 9% by mass, MFR (190° C. under a load of 2.16 kg (21.18 N)) of 6 g/10 min, and Vicat softening point of 70° C.

Polar Group-Containing Olefin-Based Copolymer (C3)

Ethylene-methyl acrylate copolymer "Elvaloy (registered trademark) AC 1125AC" manufactured by Du Pont-Mitsui Polychemicals Co., Ltd. having a methyl acrylate content of 25% by mass, MFR (190° C. under a load of 2.16 kg (21.18 N)) of 0.4 g/10 min, and Vicat softening point of 48° C.

Polar Group-Containing Olefin-Based Copolymer (C4)

Ethylene-ethyl acrylate copolymer "Ethylene-ethyl acrylate copolymer NUC-6170" manufactured by Nippon Unicar Co., Ltd. having an ethyl acrylate content of 18% by mass, MFR (190° C. under a load of 2.16 kg (21.18 N)) of 6 g/10 min, and Vicat softening point of 58° C.

Olefin-Based Copolymer (C'5)

Low density polyethylene "Novatec LD LC607K" (tradename) manufactured by Japan Polyethylene Corporation having MFR (190° C. under a load of 2.16 kg (21.18N)) of 8 g/10 min and Vicat softening point of 89° C.

Softener (D1)

Paraffin process oil "Diana Process PW-90" (tradename) manufactured by Idemitsu Kosan Co., Ltd.

The thermoplastic polymer compositions produced below were measured and evaluated for their properties by the following methods and results thereof are collectively shown in Tables 1 and 2.

Measurement of Melt Flow Rate (MFR)

Small pieces obtained by cutting each thermoplastic polymer composition sheet were measured for MFR at 230° C. under a load of 2.16 kg (21.18 N) according to the method of JIS K 7210. MFR was used as an index of the moldability, and the moldability becomes excellent with increasing MFR.

Measurement of Vicat Softening Point

The Vicat softening point was measured by Method A50 according to JIS K 7206.

Measurement of Hardness

Several sheets of each thermoplastic polymer composition were piled to a thickness of 6 mm and measured for type A hardness by using a type A durometer according to JIS K 6253.

Tensile Break Strength and Tensile Elongation at Break

A dumbbell test piece (No. 5) prepared from each thermoplastic polymer composition sheet was measured for the tensile break strength and tensile elongation at break at a tensile speed of 500 mm/min according to JIS K 6251.

Preparation of Laminate with Glass Plate

Both surfaces of a glass plate of 75 mm length×25 mm width×1 mm thickness were washed with an aqueous solution of surfactant, methanol, acetone, and distilled water successively in this order and dried at 110° C. The glass plate thus treated, each of the thermoplastic polymer composition sheets produced in the following examples and comparative examples, and a polyethylene terephthalate sheet having a thickness of 50 μm were piled in this order and the resultant pile was placed at the center of a metal spacer having outer dimensions of 200 mm×200 mm, inner dimensions of 150 mm×150 mm, and a thickness of 2 mm.

The piled sheets together with the metal spacer were placed between two sheets of polytetrafluoroethylene, which was then put between two metal plates and compression-molded by using a compression molding machine at a temperature shown in Table 1 or 2 under a load of 20 kgf/cm$^2$ (2 N/mm$^2$) for 3 min, thereby obtaining a laminate of polyethylene terephthalate-thermoplastic polymer composition sheet-glass plate.

Preparation of Laminate with Aluminum Plate

Both surfaces of an aluminum plate of 75 mm length×25 mm width×1 mm thickness were washed with an aqueous solution of surfactant and distilled water successively in this order and dried at 65° C. The aluminum plate thus treated, each of the thermoplastic polymer composition sheets produced in the following examples and comparative examples, and a polyethylene terephthalate sheet having a thickness of 50 μm were piled in this order and the resultant pile was placed at the center of a metal spacer having outer dimensions of 200 mm×200 mm, inner dimensions of 150 mm×150 mm, and a thickness of 2 mm.

The piled sheets together with the metal spacer were placed between two sheets of polytetrafluoroethylene, which was then put between two metal plates and compression-molded by using a compression molding machine at a temperature shown in Table 1 or 2 under a load of 20 kgf/cm$^2$ (2 N/mm$^2$) for 3 min, thereby obtaining a laminate of polyethylene terephthalate-thermoplastic polymer composition sheet-aluminum plate.

Measurement of Adhesion Strength

Each of the laminates produced above was measured for the adhesion strength at a peel angle of 180° and a tensile speed of 50 mm/min according to JIS K 6854-2.

Examples 1 to 8 and Comparative Examples 1 to 7

Production of Thermoplastic Polymer Composition Sheet

The raw materials in the proportions shown in Table 1 or 2 were melt-kneaded in a batch mixer at 230° C. and a screw rotation number of 200 rpm. The kneaded product was compression-molded by using a compression molding machine at 230° C. under a load of 100 kgf/cm² (9.8 N/mm²) for 3 min, thereby obtaining a thermoplastic polymer composition sheet having a thickness of 1 mm.

The obtained thermoplastic polymer composition sheet was measured and evaluated for its properties by the methods mentioned above. The results are shown in Tables 1 and 2.

The image of atomic force microscope (AFM) of the thermoplastic polymer composition sheet produced in Example 5 is shown in FIG. 1 and that of the thermoplastic polymer composition sheet produced in Comparative Example 1 is shown in FIG. 2.

TABLE 1

| | Examples | | | | | | | |
|---|---|---|---|---|---|---|---|---|
| | 1 | 2 | 3 | 4 | 5 | 6 | 7 | 8 |
| Compositions (parts by mass) | | | | | | | | |
| (A1) | 100 | 100 | 100 | 75 | 50 | 50 | 50 | 50 |
| (A2) | | | | 25 | 50 | 50 | 50 | 50 |
| (B1) | 37.5 | 37.5 | | 37.5 | 37.5 | 37.5 | 37.5 | 37.5 |
| (B2) | | | 30 | | | | | |
| (C1) | 50 | 10 | 10 | 50 | 50 | | | |
| (C2) | | | | | | 50 | | |
| (C3) | | | | | | | 50 | |
| (C4) | | | | | | | | 50 |
| (C'5) | | | | | | | | |
| (D1) | 100 | 100 | 100 | 100 | 100 | 100 | 100 | 100 |
| MFR (g/10 min) | 1.2 | 0.7 | 0.4 | 4.3 | 11 | 9.9 | 11 | 9.8 |
| Hardness | 55 | 47 | 45 | 54 | 51 | 54 | 48 | 48 |
| Tensile break strength (MPa) | 12 | 11 | 11 | 8.9 | 8.3 | 9.0 | 12 | 7.9 |
| Tensile elongation at break (%) | 820 | 870 | 870 | 770 | 750 | 760 | 800 | 790 |
| Adhesion strength (N/25 mm) Glass | | | | | | | | |
| 240° C. | 61 | 63 | 60 | 70 | 91 | 26 | 100 | 91 |
| 180° C. | 58 | 22 | 20 | 45 | 60 | 23 | 50 | 26 |
| Aluminum | | | | | | | | |
| 240° C. | 56 | 57 | 55 | 71 | 86 | 25 | 105 | 93 |
| 180° C. | 52 | 21 | 21 | 43 | 55 | 22 | 57 | 27 |

TABLE 2

| | Comparative Examples | | | | | | |
|---|---|---|---|---|---|---|---|
| | 1 | 2 | 3 | 4 | 5 | 6 | 7 |
| Compositions (parts by mass) | | | | | | | |
| (A1) | 100 | 100 | 100 | 50 | 100 | 50 | |
| (A2) | | | | 50 | | 50 | |
| (B1) | 37.5 | 37.5 | 37.5 | 37.5 | 37.5 | 37.5 | 37.5 |
| (B2) | | | | | | | |
| (C1) | | 3 | 120 | | | | 50 |
| (C2) | | | | | | | |
| (C3) | | | | | | | |
| (C4) | | | | | | | |
| (C'5) | | | | | 50 | 50 | |
| (D1) | 100 | 100 | 100 | 100 | 100 | 100 | |
| MFR (g/10 min) | 0.9 | 0.5 | 2.6 | 9.0 | 1.3 | 12 | 31 |
| Hardness | 57 | 45 | 58 | 41 | 60 | 55 | 90 |
| Tensile break strength (MPa) | 10 | 11 | 11 | 7.5 | 12 | 8.3 | 9.7 |
| Tensile elongation at break (%) | 850 | 890 | 650 | 720 | 810 | 740 | 290 |
| Adhesion strength (N/25 mm) Glass | | | | | | | |
| 240° C. | 67 | 82 | 60 | 2 | 3 | 2 | 40 |
| 180° C. | 3 | 3 | 15 | 14 | 3 | 3 | 12 |
| Aluminum | | | | | | | |
| 240° C. | 62 | 73 | 45 | 2 | 3 | 3 | 37 |
| 180° C. | 2 | 1 | 12 | 15 | 2 | 2 | 9 |

As seen from Table 1, it can be found that the thermoplastic polymer compositions produced in Examples 1 to 8 were excellent in the flexibility, mechanical properties, and moldability and had a good adhesion to ceramic, metal, and synthetic resin without a priming treatment, particularly, adhered to ceramic, metal, and synthetic resin even by the treatment at a temperature as low as 190° C. or lower. In contrast, any the thermoplastic polymer compositions produced in Comparative Examples failed to show a sufficient adhesion at 180° C.

Upon comparing Example 1 with Example 2, it can be found that the adhesion strength by the heat treatment at 180° C. was drastically increased by increasing the amount of the polar group-containing olefin-based copolymer (C) from 10 parts by mass to 50 parts by mass based on 100 parts by mass of the thermoplastic elastomer (A).

Upon comparing Example 1 with Examples 4 and 5, it can be found that MFR of the thermoplastic polymer composition was increased to further improve the moldability by combinedly using a medium molecular weight polymer and a high molecular weight polymer as the thermoplastic elastomer (A). From Examples 5 to 8, it can be found that the adhesion strength by the heat treatment at 180° C. or 240° C. was further improved when Vicat softening point of the polar group-containing olefin-based copolymer (C) was within a range of 45 to 65° C. (Examples 5, 7, and 8) and still further improved within a range of 45 to 55° C. (Examples 5 and 7).

From Table 2, it can be seen that a sufficient adhesion was not obtained in Comparative Examples 1 and 4 wherein the polar group-containing olefin-based copolymer (C) was not contained, in Comparative Example 1 wherein the content of the polar group-containing olefin-based copolymer (C) was extremely small, and in Comparative Example 3 wherein the content of the polar group-containing olefin-based copolymer (C) was excessively large.

In Comparative Examples 5 and 6 wherein polyolefin having no polar group was used in place of the polar group-containing olefin-based copolymer (C), a sufficient adhesion was not obtained by both the heat treatments at 180° C. and 240° C.

In Comparative Example 7 wherein the thermoplastic elastomer (A) was not used, good mechanical properties were not obtained and a sufficient adhesion was not obtained by the heat treatment at 180° C.

In FIGS. 1 and 2, the lower sides are the surfaces of the sheets. In FIG. 2, the polyvinyl acetal resin (component (B)) is present in the thermoplastic elastomer (component (A)) in island forms inside the sheet, but sparsely present in the surface portion of the sheet. In contrast, in FIG. 1, the ethylene-methyl acrylate copolymer (the component (C)) and the polyvinyl acetal resin (the component (B)) are present in the surface portion of the sheet. Although not fully elucidated, the strong bonding between the component (A) and the component (C) and the strong bonding between the component (B) and the component (C) may prevent the interface between the components from being broken by the peeling force. The difference in the properties between the thermoplastic polymer compositions produced in Examples and those produced in Comparative Examples would be attributable to the difference in the dispersion states of the components.

INDUSTRIAL APPLICABILITY

The thermoplastic polymer composition of the invention is useful as adhesives for joining glass with aluminum sash or metal openings of windows of automobiles and buildings or joining glass with metal frame of photovoltaic modules.

The molded product comprising the thermoplastic polymer composition of the invention is useful as housing materials for electronic or electric appliances, OA equipments, household appliances, and automotive parts, specifically as housing materials for large-sized display, notebook computer, mobile phone, PHS, PDA (personal digital assistant, such as electric organizer), electronic dictionary, video camera, digital still camera, portable radio cassette player, and inverter.

The thermoplastic polymer composition is also useful in a wide application as a molded product or structural member to be adhered to glass, for example, a window molding or gasket for automobiles and buildings, a sealant for glass, and an anti-corrosion material.

The thermoplastic polymer composition is further useful as the separator of rechargeable batteries for use in personal digital assistants, such as notebook computer, mobile phone, and video camera, hybrid vehicle, and fuel cell vehicle.

REFERENCE CHARACTERS (A) Thermoplastic elastomer comprising a block copolymer which is constituted by a polymer block comprising aromatic vinyl compound units and a polymer block comprising conjugated diene units or a hydrogenated product of the block copolymer.
(B) Polyvinyl acetal resin.
(C) Polar group-containing olefin-based copolymer.

What is claimed is:

1. A thermoplastic polymer composition, comprising:
(A) 100 parts by mass of a thermoplastic elastomer (A);
(B) 1 to 100 parts by mass of a polyvinyl acetal resin (B);
(C) 5 to 100 parts by mass of a polar group-containing olefin-based copolymer (C); and
(D) 0.1 to 300 parts by mass of a softener (D),
wherein the thermoplastic elastomer (A) is a block copolymer comprising a polymer block comprising aromatic vinyl compound units and a polymer block comprising conjugated diene units, or a hydrogenated product of the block copolymer comprising a polymer block comprising aromatic vinyl compound units and a polymer block comprising conjugated diene units, and
wherein the polar group-containing olefin-based copolymer (C) is an olefin-(meth)acrylate random copolymer.

2. The thermoplastic polymer composition according to claim 1, comprising:
100 parts by mass of the thermoplastic elastomer (A);
10 to 70 parts by mass of the polyvinyl acetal resin (B);
10 to 70 parts by mass of the polar group-containing olefin-based copolymer (C); and
1 to 200 parts by mass of the softener (D).

3. The thermoplastic polymer composition according to claim 1, wherein the polyvinyl acetal resin (B) is obtained by acetalizing a polyvinyl alcohol having an average degree of polymerization of 100 to 4,000 to a degree of acetalization of 55 to 88% by mole.

4. The thermoplastic polymer composition according to claim 1, wherein the polyvinyl acetal resin (B) is a polyvinyl butyral.

5. The thermoplastic polymer composition according to claim 1, wherein a melt flow rate (MFR) of the polar group-containing olefin-based copolymer (C) is 0.1 to 100 g/10 min when measured at 190° C. under a load of 2.16 kg (21.18 N).

6. The thermoplastic polymer composition according to claim 1, wherein a Vicat softening point of the polar group-containing olefin-based copolymer (C) is 40 to 100° C.

7. The thermoplastic polymer composition according to claim 1, wherein the polar group-containing olefin-based copolymer (C) is an ethylene-methyl acrylate random copolymer.

8. A molded product, comprising the thermoplastic polymer composition according to claim 1.

9. The molded product according to claim 8, wherein the thermoplastic polymer composition is adhered to at least one material selected from the group consisting of ceramics, metals, and synthetic resins.

10. The molded product according to claim 9, wherein the thermoplastic polymer composition is adhered to at least one material selected from the group consisting of ceramics and metals.

11. The molded product according to claim 8, wherein ceramics, metals, synthetic resins, or at least two materials selected from the group consisting of ceramics, metals, and synthetic resins, are adhered to each other by the thermoplastic polymer composition.

12. The thermoplastic polymer composition according to claim 2, wherein the polyvinyl acetal resin (B) is obtained by acetalizing a polyvinyl alcohol having an average degree of polymerization of 100 to 4,000 to a degree of acetalization of 55 to 88% by mole.

13. The thermoplastic polymer composition according to claim 2, wherein the polyvinyl acetal resin (B) is a polyvinyl butyral.

14. The thermoplastic polymer composition according to claim 1, wherein the thermoplastic elastomer (A) is the block copolymer comprising a polymer block comprising aromatic vinyl compound units and a polymer block comprising conjugated diene units.

15. The thermoplastic polymer composition according to claim 1, wherein the thermoplastic elastomer (A) is the hydrogenated product of the block copolymer comprising a polymer block comprising aromatic vinyl compound units and a polymer block comprising conjugated diene units.

16. The thermoplastic polymer composition according to claim 15, wherein the degree of hydrogenation of the polymer block comprising conjugated diene units is 80% or more.

* * * * *